United States Patent [19]

Bauknecht et al.

[11] Patent Number: 5,352,100
[45] Date of Patent: Oct. 4, 1994

[54] PUMP DRIVE FOR A MOTOR VEHICLE AUTOMATIC TRANSMISSION

[75] Inventors: Gert Bauknecht, Immenstaad; Rainer Pfalz; Manfred Bucksch, both of Friedrichshafen, all of Fed. Rep. of Germany

[73] Assignee: Zahnradfabrik Friedrichshafen AG, Fed. Rep. of Germany

[21] Appl. No.: 30,457

[22] PCT Filed: Oct. 4, 1991

[86] PCT No.: PCT/EP91/01900

§ 371 Date: Apr. 1, 1993

§ 102(e) Date: Apr. 1, 1993

[87] PCT Pub. No.: WO92/07204

PCT Pub. Date: Apr. 30, 1992

[30] Foreign Application Priority Data

Oct. 10, 1990 [DE] Fed. Rep. of Germany ....... 4032081

[51] Int. Cl.⁵ .................. F16D 33/00; F04B 17/00
[52] U.S. Cl. ...................... 417/405; 60/341; 60/339; 415/110
[58] Field of Search ............ 417/405; 60/336, 337, 60/339, 340, 357, 358, 341; 415/110, 111, 112, 113

[56] References Cited

U.S. PATENT DOCUMENTS

| | | | |
|---|---|---|---|
| 3,210,940 | 10/1965 | Bunnelle | 60/358 |
| 3,554,661 | 1/1971 | Oglesby et al. | 415/112 |
| 4,592,203 | 6/1986 | Stubbs | 60/358 |

FOREIGN PATENT DOCUMENTS

| | | | |
|---|---|---|---|
| 1168274 | 12/1958 | France | 60/358 |
| 2185062 | 12/1973 | France | . |
| 4157248 | 5/1992 | Japan | 60/358 |
| 1008497 | 10/1965 | United Kingdom | 60/359 |
| 2076907 | 12/1981 | United Kingdom | . |
| 2110345 | 6/1983 | United Kingdom | . |

OTHER PUBLICATIONS

ATZ Automobiltechnische Zeitschrift 91 No. 9, 1989, pp. 445–453; H. Schopf: "Mercedes-Benz Funfgang-n-Automatikgetriebe" cited in the application.

*Primary Examiner*—Edward K. Look
*Assistant Examiner*—Hoang Nguyen
*Attorney, Agent, or Firm*—Davis, Bujold & Streck

[57] ABSTRACT

In a pump drive for a motor vehicle automatic gearbox, a hollow shaft (6) secured in rotation to a primary part (3) of a torque converter (1) projects into the inside of a pump housing (7) and bears an impeller (10) of the pump. The hollow shaft (6) is borne in a bore (12) in the pump housing (7) via a rolling bearing, whereby, in order to seal the pump housing, there is a radial sealing ring (18) on one side of the rolling bearing and a sealing ring (14) on the other. The latter ring (14) is designed to enclose a uniform sealing gap (25) with the hollow shaft (6) and it is guided freely both radially and axially in the bore (12) so that the sealing gap (25) may automatically set itself.

4 Claims, 1 Drawing Sheet

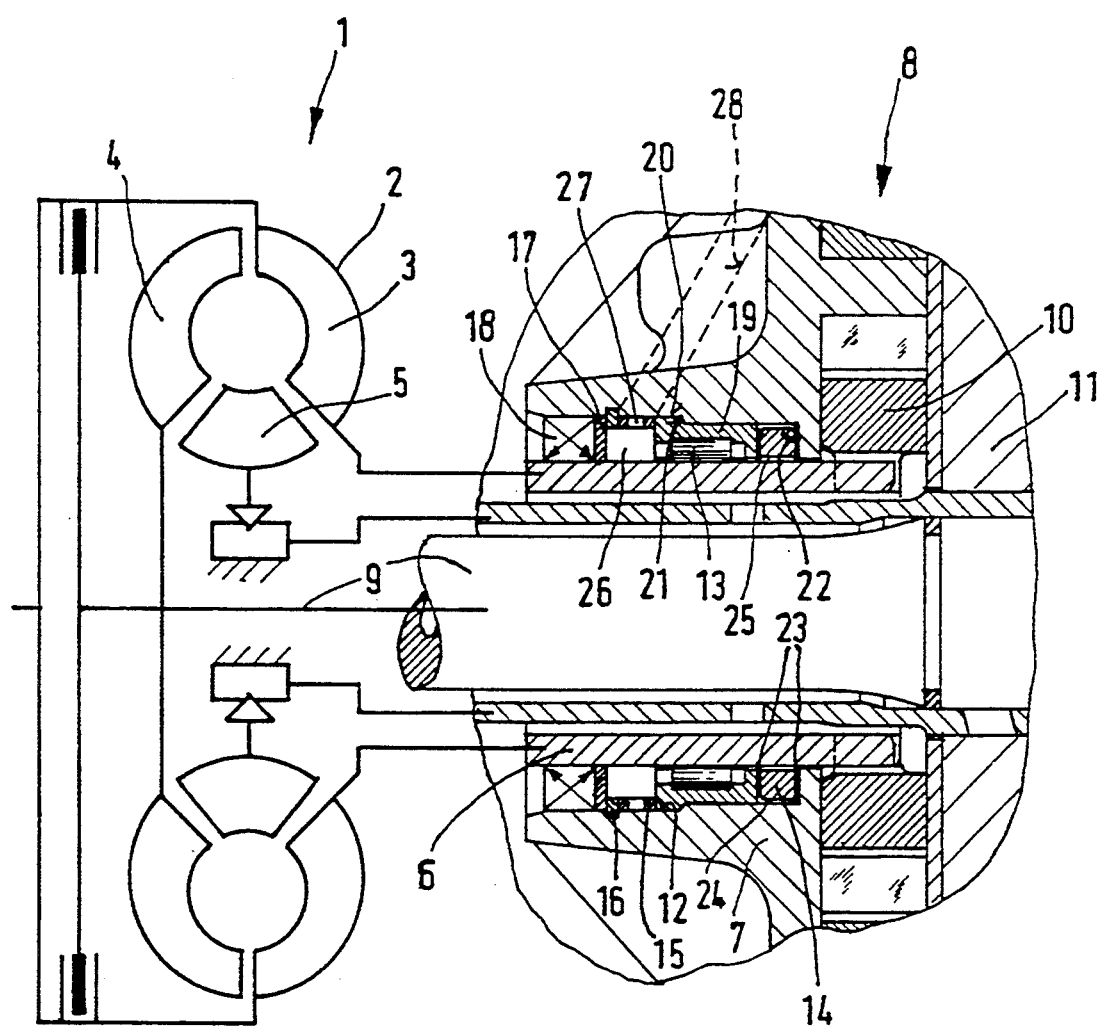

PUMP DRIVE FOR A MOTOR VEHICLE AUTOMATIC TRANSMISSION

The invention concerns a pump drive for a motor vehicle automatic transmission in which a converter shell constructed together with a primary part of a torque converter is non-rotatably connected with a hollow shaft of which the other end is passed into an interior of a pump housing and drives an impeller wherein the hollow shaft is supported via a roller bearing in a bore of the pump housing while in said bore there is situated, on the side of the roller bearing facing the converter shell, a radial sealing ring having at least one sealing lip contacting the hollow shaft and, on the side facing the impeller, a sealing ring which with the hollow shaft encloses a sealing gap.

BACKGROUND OF THE INVENTION

A pump drive of the above mentioned kind has been disclosed in the publication ATZ automobile engineering periodical 91 (1989) 9, page 445. The sealing ring, designed as plastic disc, is here pressed or glued in the drilling. As result of manufacturing tolerances, this rigid fastening of the sealing ring to the pump housing could result in the sealing ring having an uneven sealing gap relative to the hollow shaft. In the extreme case, the possibility that the sealing ring touches the hollow shaft in a certain area exists whereby extreme wear occurs. These problems are further intensified by the fact that the sealing ring and the hollow shaft have different coefficients of thermal expansion.

SUMMARY OF THE INVENTION

Therefore, the problem to be solved by this invention is, in a pump drive of the above kind, to situate a sealing ring in a manner such that it always forms a uniform sealing gap with the hollow shaft.

In a pump drive of the above mentioned kind, this problem is solved by the fact that the sealing ring is floatingly passed into the bore, the sealing ring has a radial play relative to the bore and an axial play relative to its axial limit formed by an outer ring of the roller bearing and a stop. When the hollow shaft rotates, the sealing ring inserted with radial play into the pump housing can now be centered relative to the hollow shaft whereby a uniform sealing gap is obtained. Tolerances in the production of the pump housing and the support of the hollow shaft can be compensated by the radial mobility of the sealing ring as well as radial movement of the hollow shaft. The sealing gap appearing here can be designed in accordance with the required amount of oil leakage to be fed to the roller bearing. By virtue of the pressure prevailing in the interior of the hollow shaft and in the pump, the sealing ring is pressed against the outer ring of the roller bearing so that a favorable sealing effect is likewise obtained.

According to a further feature, in a design of the pump drive where the amount of oil leakage that passes the sealing gap and flows through the roller bearing is fed, via at least one reverse bore situated in the pump housing, to an oil sump or to the pump on the suction side, a spacer ring having an outer diameter corresponding to the diameter of the bore is to be situated between the side of the outer ring facing the torque converter and the radial sealing ring, the spacer ring forms, opposite the hollow shaft, an oil collector and has at least one radial reverse opening. The roller bearing which has an annular shoulder is forced by said spacer ring against a locating face of the drilling. The leakage oil collected in the oil collector is fed, via the radial bores of the spacer ring, to the reverse bore or bores.

In addition, according to a further feature, a guide disc, which has radial play relative to the hollow shaft, is to be situated between the spacer ring and the radial sealing ring. Said guide disc serves as a front centering in the assembly of the pump drive and, during the assembly, protects the sealing ring against damage.

Finally, according to a still further feature, the sealing ring is produced from a material having the same coefficient of thermal expansion as the hollow shaft. By using an adequate material for the sealing ring, it is possible to provide a permanently uniform sealing gap even with extreme changes of temperature.

BRIEF DESCRIPTION OF THE DRAWING

For a further explanation of the invention reference is had to the drawing where an embodiment is shown in simplified manner. The single figure shows a partial view of an automatic transmission having a torque converter and a pump drive diagrammatically shown in longitudinal section.

DESCRIPTION OF THE PREFERRED EMBODIMENT

In the FIGURE, the numeral 1 designates a torque converter, the torque shell 2 of which non-rotatably carries a primary part 3 that acts as a pump. A turbine wheel 4 and a stator 5 are also situated within the torque shell 2. The converter shell 2 driven by a crankshaft, not shown in detail, of an internal combustion engine is non-rotatably connected with a hollow shaft 6 which by its other end is passed into the interior of a pump housing 7 of a pump 8 designed as a curved pump. Said pump 8 serves to supply a control system, not shown, with pressurized fluid and to supply lubricant to an automatic transmission driven by the turbine wheel 4 of the torque converter 1 via an input shaft 9 coaxially extending relative to the hollow shaft 6.

The hollow shaft 6 supports an impeller 10 of the pump 8. The pump housing 7 is connected with an intermediate plate 11 of the automatic transmission and has a bore 12 in which the hollow shaft 6 is supported. The special design of the support of the hollow shaft 6 in the pump housing 7 and the special sealing thereof are explained herebelow with reference to the drawing. A roller bearing 13, which is preferably to be designed as needle bearing, serves as a support. In direction of the impeller 10, a sealing ring adjoins the roller bearing 13 while a spacer ring 15, a snap ring 16, a guide disc 17 and finally a radial sealing ring 18 adjoin the roller bearing 13 in the direction of the torque shell 2.

The roller bearing 13 has an outer ring 19 which is secured with an annular shoulder 20 in the bore 12 in an axial direction on a locating face. Between said outer ring 19 fixed in the axial direction and a stop 22 of the bore, the sealing ring 14 is situated so as to have, on one hand, axial play relative to the outer ring 19 and the stop 22 and, on the other, radial play between its external periphery and the bore 12. Besides, a uniform sealing gap is provided between the sealing ring 14 and the hollow shaft 6.

The spacer ring 15, by which the roller bearing 13 is fixed in the axial direction by means of the snap ring 16, is fitted from the outside into the bore 12 whereby it has a space on its inner periphery opposite the hollow shaft whereby an oil collector 26 is formed. In addition, the spacer ring has at least one radial reverse opening 27 which discharges in a reverse bore 28 of the pump housing 7. The lubricant that flows through the roller bearing 13 across the sealing gap 25 and then accumulates in the oil collector 26 is passed via the reverse bore to the pump 8 on the suction side or into an oil sump of the automatic transmission. The radial sealing ring 18 prevents the lubricant accumulating almost without pressure in the oil collector 26 from reaching the open air. In the above mentioned manner, the torque converter 1 is supported in the pump housing 7 by means of the hollow shaft 6 and provision is made for sealing of the pressurized fluid out-cropping into the interior of the hollow shaft 6 from the torque converter 1 and of the pressurized fluid from the pump 8.

As result of its radial play 24 present on the periphery, the sealing ring 14 can be centered relative to the hollow shaft 6 so as to have all together a uniform sealing gap 25. A predetermined amount of lubricant is fed to the roller bearing 13 via said uniform sealing gap while the radial sealing ring 18 ensures an absolute sealing of the support exclusively externally. When the hollow shaft 6 does not move, there prevails also in the interior of the hollow shaft 6 starting from the torque converter 1 a pressure which acts on the end face of the sealing ring 14 and presses it snugly against the outer ring 19 of the roller bearing 13. Thus, by virtue of the arrangement and construction of the sealing ring according to the invention, a very effective sealing of the support of the hollow shaft 6 can be provided.

| Reference numerals | |
|---|---|
| 1 | torque converter |
| 2 | converter shell |
| 3 | impeller |
| 4 | turbine wheel |
| 5 | stator |
| 6 | hollow shaft |
| 7 | pump housing |
| 8 | pump |
| 9 | input shaft |
| 10 | impeller |
| 11 | intermediate plate |
| 12 | drilling |
| 13 | roller bearing |
| 14 | sealing ring |
| 15 | spacer ring |
| 16 | snap ring |
| 17 | guide disc |
| 18 | radial sealing ring |
| 19 | outer ring |
| 20 | ring shoulder |
| 21 | locating face |
| 22 | stop |
| 23 | axial play |
| 24 | radial play |
| 25 | sealing gap |
| 26 | oil collector |
| 27 | radial reverse opening |
| 28 | reverse bore |

We claim:

1. A pump drive for supplying fluid to a motor vehicle automatic transmission, said pump drive including a torque converter (1) comprising:
    a first torque converter primary part (4);
    a stator; and
    a torque shell (2) being non-rotatably connected together with a second torque converter primary part (3); said torque shell (2) being further connected to a first end of a hollow shaft (6), a second end of said hollow shaft (6) passing into an interior of a pump housing (7) and being drivingly connected to an impeller (10) of a pump, said hollow shaft (6) being supported in a bore (12) of said pump housing (7) via a roller bearing (13), a radial sealing ring (18), having at least one sealing lip engagable with said hollow shaft (6), being situated in said bore (12) on a side of said roller bearing facing said torque shell (2), and a second sealing ring (14) being situated in said bore (12) and surrounding said hollow shaft (6), on a side facing said impeller (10), and forming with said hollow shaft (6) a sealing cap (25);
    wherein said second sealing ring (14) is floatingly passed into said bore (12), said second sealing ring (14) has radial play (24) relative to said bore (12) and has axial play (23) relative to axial limits formed by an outer ring (19) of said roller bearing (13) and a stop (22) of said bore (12), and the amount of said axial play (23) for said second sealing ring (14) is determined by an axial position of said outer ring (19) once said outer ring (19) is biased against a locating face (21) of said pump housing (7).

2. A pump drive for supplying fluid to a motor vehicle automatic transmission, said pump drive including a torque converter (1) comprising:
    a first torque converter primary part (4);
    a stator; and
    a torque shell (2) being non-rotatably connected together with a second torque converter primary part (3); said torque shell (2) being further connected to a first end of a hollow shaft (6), a second end of said hollow shaft (6) passing into an interior of a pump housing (7) and being drivingly connected to an impeller (10) of a pump, said hollow shaft (6) being supported in a bore (12) of said pump housing (7) via a roller bearing (13), a radial sealing ring (18), having at least one sealing lip engagable with said hollow shaft (6), being situated in said bore (12) on a side of said roller bearing facing said torque shell (2), and a second sealing ring (14) being situated in said bore (12) and surrounding said hollow shaft (6), on a side facing said impeller (10), and forming with said hollow shaft (6) a sealing gap (25);
    wherein said second sealing ring (14) is floatingly passed into said bore (12), said second sealing ring (14) has radial play (24) relative to said bore (12) and has axial play (23) relative to an axial limit formed by an outer ring (19) of said roller bearing (13) and a stop (22) of said bore (12), and said outer ring (19) is biased against a locating face (21) of said pump housing (7) to define the amount of said axial play (23), any fluid leaking past said sealing gap (25) and flowing through said roller bearing (13) is fed via at least one reverse bore (28), situated in said pump housing (7), to one of an oil sump and a suction side of the pump, a spacer ring (15), having an outer diameter which corresponds to an inner diameter of said bore (12), is situated between said radial sealing ring (18) and the side of said outer ring (19) facing said torque converter (1), and said spacer ring (15) has at least one radial opening (27) providing therein and forms with said hollow shaft (6) an oil collector space (26).

3. A pump drive according to claim 2, wherein a guide disc (17) is situated between said spacer ring (15) and said radial sealing ring (18) and said guide disc (17) has radial play relative to said hollow shaft (6).

4. A pump drive according to claim 1, wherein said second sealing ring (14) is made of a material having the same coefficient of thermal expansion as said hollow shaft (6).

* * * * *